Patented Mar. 12, 1929.

1,705,333

UNITED STATES PATENT OFFICE.

CHARLES AUGUSTINE MULLEN, OF MONTREAL, QUEBEC, CANADA, ASSIGNOR, BY MESNE ASSIGNMENTS, TO AMIESITE ASPHALT COMPANY OF AMERICA, OF PHILADELPHIA, PENNSYLVANIA, A CORPORATION OF NEW JERSEY.

PAVEMENT AND METHOD OF MANUFACTURING THE SAME.

No Drawing.   Application filed March 14, 1927. Serial No. 175,425.

This invention relates to improvements in pavement and method of manufacturing the same, and in general relates to that type of pavement which is constructed of one or more layers of mixture consisting of intermingled irregularly shaped mineral or other rigid particles, such as crushed rock, gravel, slag, sand, dust, known as the aggregate, coated and cemented together by a bituminous or other plastic material, such as asphalt, tar, oil, known as the cementing medium, in which type of pavement such a layer of mixture is spread and compressed, while sufficiently plastic, upon another such layer or upon a prepared base or foundation.

The objects of my invention are to effect an economy of time in the mixing operation, and a better spreading and adhesion of the component parts of the mixture without the necessity of resorting to such expedients as the drying or heating of the broken stone prior to the application of the other ingredients thereto.

A variety of paving mixtures have been made in which the principal ingredients are broken rock, a liquefier such as kerosene, and asphalt cement, and it has also been proposed that the liquefier should be applied as a priming to the broken rock before the asphalt is applied thereto, and that following the application of the asphalt cement, hydrated lime should be added to the mixture. In some instances a fine stone grit or sand has been added to the mixture as a filler.

In making such a mixture it has usually been found desirable to specially dry or heat the rock before the application of the priming coat, for experience has shown that inequalities in the moisture coating of quarry dry stone has resulted in unsatisfactory conditions of the mixture and of the pavement produced therefrom.

The present invention is based upon the discovery that if the broken rock or like material, from which the aggregate is formed, is given a primary coat with a diffusion agent such as water, preferably heated, before the introduction of the light oil priming, which diffusion agent is not miscible with the light oil priming coat and is preferably of lower viscosity than the same, then such an agent, which spreads rapidly over the surface of the broken rock, is found to assist greatly the diffusion of the light oil, which in turn facilitates the diffusion of the asphalt cement and forms in part a temporary flux for the same.

To accelerate the spreading of the asphalt over the liquefier-primed stones, I may, and usually do add an impalpably fine gritty material such as ground silica, clay, talc, infusorial or diatomatious earth, fuller's earth, bentonite, hydrated lime, lime oxide, calcium carbonate or whiting, gypsum or plaster of Paris, or the like, to act as a cement distributing agent in the process; and these materials I sometimes add before or after applying the water or liquefier or asphalt, and one or any combination of them before and after the liquids.

The materials that I prefer to use in making my paving composition are: broken rock, water, lime, kerosene, asphalt and filler.

Obviously gravel, whole or crushed, crushed slag, shells, and many other forms of irregularly shaped rigid particles may be used instead of the broken rock.

Some other liquid than water might produce a like result, or something might be added to the water to improve or add to its action.

The lime may be pulverized limestone, calcium oxide or calcium hydrate, whiting; or any other impalpably fine substance may be substituted therefor.

Tar or other bituminous or plastic cement might be substituted for the asphalt with satisfactory results, and the asphalt may itself carry a proportion of fine material.

The filler may be either the sand-sized grit from crushed stone, or river bank sand, or other like material.

In practically carrying out the process, the materials from which the paving mixture is to be formed are introduced into a mixer, preferably in the following order: Broken rock, water, lime, kerosene, lime, asphalt, lime and filler.

The second and third portions of lime or like impalpably fine material are not always used; and, when used, are not always in the same form as the first portion, since the first portion has a function to perform not required of the others; and, this element may be omitted altogether.

The filler may be omitted entirely, if desired, or it may be introduced in any order.

By the introduction of the materials in the order named, the water, as previously explained, is caused to act as a diffusion agent on the surface of the rock, to thereby facilitate the spreading of the kerosene on the same, which in turn facilitates the spreading of the asphalt. The lime also appears to act as a cement distributing agent and as a means for facilitating the intimate mixture and adhesion of the various other constituents.

It may be found convenient in some instances to combine certain of the materials in the form of an emulsion and it will of course be obvious that the lime or like material may be introduced in admixture with the water, kerosene, or asphalt, if desired.

The proportions of the various ingredients named will depend upon the character of the road to which the paving mixture is to be applied, and will be such as is ordinarily used in mixtures containing crushed rock, a liquefier such as kerosene, asphaltic cement, with or without a filler, and lime, the present invention being directed towards the method of mixing and to the character of the pavement produced when so mixed rather than to the particular proportions of the mixture, which proportions are already known and familiar to those skilled in the art.

The variations that are necessary even when producing a given grade of mixture are due to many factors, among which are the exact quality of each material which is secured, the unavoidable variations in the deliveries thereof, the time of the year and the atmospheric conditions that prevail, and the proposed use. Much greater variations in the proportions are necessary when producing coarser or finer mixtures, or compositions which are desired to be more or less dense.

The handling and laying of the above composition is accomplished without it being necessary to use heat for any purpose except usually that of liquefying the asphalt or like material prior to introducing it into the mixture to be spread over the surfaces of the doubly-primed fragments of broken rock. The composition can be dumped into cars or trucks, transported distances requiring many days, unloaded, spread, and compacted without further treatment of any kind.

As many changes could be made in the above construction and many apparently widely different embodiments of my invention, within the scope of the claims, constructed without departing from the spirit or scope thereof, it is intended that all matter contained in the accompanying specification shall be interpreted as illustrative and not in a limiting sense.

What I claim as my invention is:—

1. A method of mixing paving mixtures comprising irregularly shaped rigid particles, a liquefier and an asphalt cement, which consists in first applying to the particles a liquid diffusion agent that is not miscible with the liquefier, and then applying the liquefier.

2. The method as claimed in claim 1, in which a cement distributing agent is added to the mixture both before and after the cement is added thereto.

3. The method as claimed in claim 1, in which a cement distributing agent is added to the mixture before the liquefier and both before and after the cement is added thereto.

4. The herein described method of manufacturing a paving mixture such as herein described which comprises first intermingling irregularly shaped rigid mineral particles with water, then adding kerosene and then adding asphaltic cement.

5. The method as claimed in claim 4 in which impalpably fine material is added to the mixture after the kerosene and before the asphaltic cement.

6. The method as claimed in claim 4 in which impalpably fine material is added to the mixture before and after the asphaltic cement.

7. The method as claimed in claim 4 in which impalpably fine material is added to the mixture before the liquefier, and before and after the asphalt cement.

8. The method of manufacturing a paving mixture comprising irregularly shaped rigid particles, a liquefier, and a bitumen cement, which consists in uniformly disseminating the liquefier by means of a diffusion agent that is not miscible with the liquefier, and thereafter incorporating the cement.

9. The method of manufacturing paving mixtures comprising irregularly shaped rigid particles, a liquefier, and a bitumen cement, which consists in first applying to the particles a liquid diffusion agent that is not miscible with the liquefier, then applying the liquefier, and thereafter incorporating the cement.

In witness whereof I have hereunto set my hand.

CHARLES AUGUSTINE MULLEN.